United States Patent Office

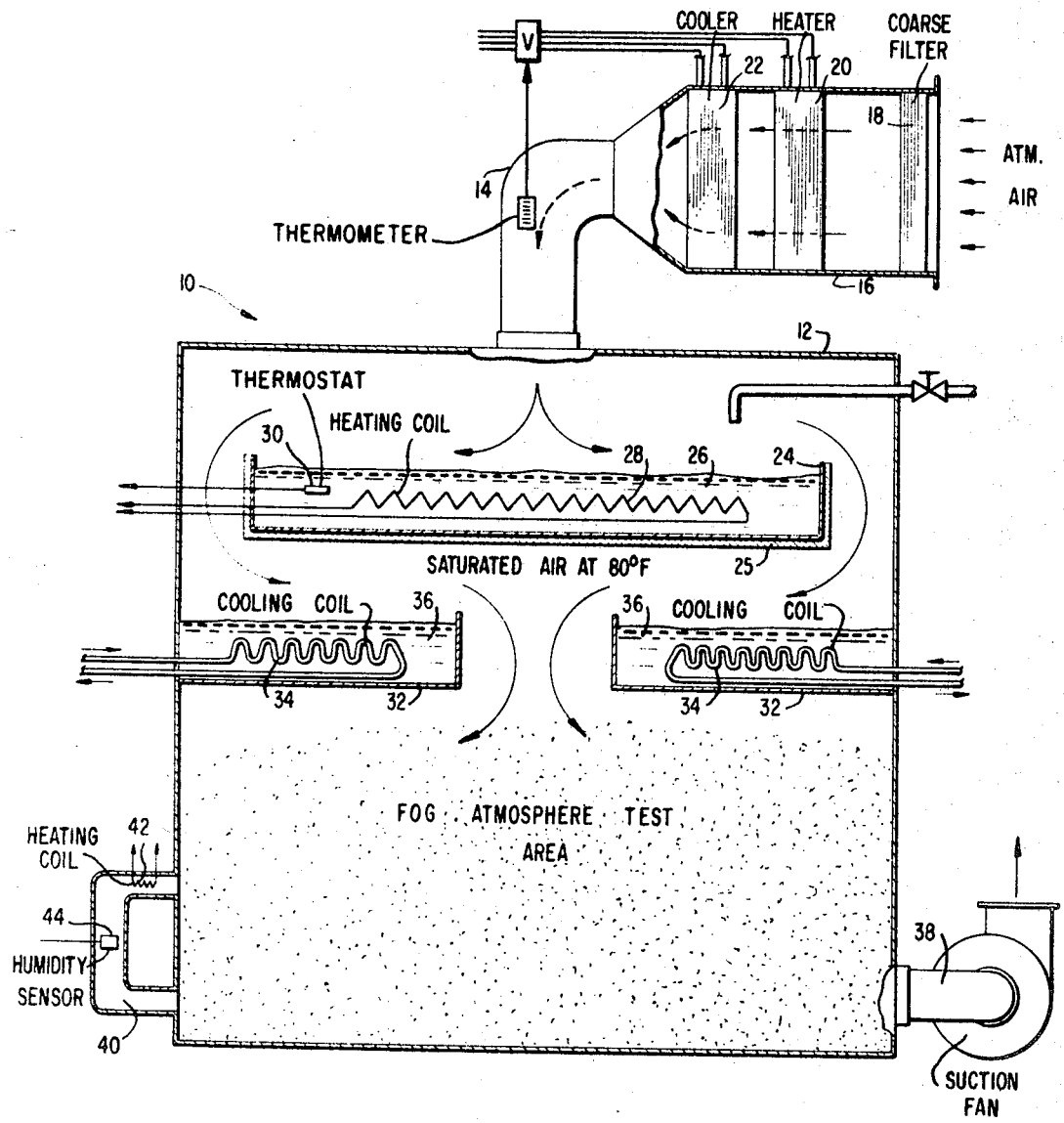

3,444,092
Patented May 13, 1969

3,444,092
FOG GENERATOR AND CHAMBER
Andrew Truhan, R.D. 3, Box 392T,
Somerset, N.J. 08873
Filed Mar. 28, 1967, Ser. No. 626,630
Int. Cl. B01f *3/08;* G05d
U.S. Cl. 252—359                 4 Claims

---

ABSTRACT OF THE DISCLOSURE

A fog producing apparatus within a cabinet structure defines an environmental chamber for testing molds, drugs, and the like. Atmospheric air is filtered to remove large particles, the air saturated, then cooled to cause fog formation.

---

This invention relates to an apparatus for producing a fog and exhibits utility as a laboratory environmental chamber wherein such diverse biological ensembles as molds, plants, and drugs may be placed for the purpose of observing their behavior under moist ambient conditions. Other examples of utility reside in the testing of paints or other coating compositions, rust inhibiting compositions, and the like.

In general, a fog may be considered a colloidal suspension defined by small droplets of water forming on tiny particles which are nearly always present in atmospheric air. It is possible to classify fogs in many ways, as well as the classification of several methods, both natural and artificial, which produce them. For the purpose of an understanding of this invention, however, the above definition of a fog as a colloidal suspension will be sufficient in order to enable others in this art to practice this invention.

According to the present invention, the apparatus herein described produces fog by utilizing the small particles which are generally present in the atmosphere. The apparatus effects control of several temperature parameters in a simple and rugged manner due to its inherent geometry. According to the invention, the apparatus filters coarse or large particles from atmospheric air and subjects the air to a heat exchange process in order to bring it to a certain temperature. The air is then passed over heated water to thereby saturate it. The saturated air, together with the fine and naturally occurring small particles therein, is next cooled to produce the desired fog. The fog producing apparatus is situated in a chamber in which the biological organisms, compositions, or the like, which are to be tested are provided with a humidity sensor to maintain the desired fog conditions.

Referring now to the drawing, the numeral 10 denotes generally the fog generator or environmental chamber of this invention. The apparatus includes a main chamber defined by sheet metal walls 12 with the chamber being generally rectangular in configuration and an inlet duct 14 positioned at the top of the chamber. The duct 14 includes at its open extremity a portion 16 of larger diameter, with the extreme end provided with a filter 18. The filter may be of any desired conventional construction and functions to filter out relatively large particles from the atmospheric air which enters the duct. A heater 20 of any desired conventional construction is positioned somewhat laterally or downstream of the filter 18 and a cooling element 22, also of any desired conventional construction, is placed laterally or downstream of the heater element 20. The function of elements 20 and 22 is to thermally treat or condition the incoming atmospheric air after its filtration by element 18 so that the temperature of the air from duct 14 as it enters the interior of chamber 10 is approximately 80° F.

Suitably positioned and supported within the top portion of the chamber 10 is a pan 24 containing a volume of water 26. Appropriate piping, not illustrated, feeds into pan 24 to maintain the volume 26, as the latter evaporates. A heating coil, preferably of the electrical resistance type and schematically indicated, is denoted by the numeral 28, and a thermostat 30 are both located within the body of water 26. By virtue of suitable connections well known to workers in this art and not illustrated, the thermostat 30 cooperates with the heating element 28 to maintain the temperature of the body of water 26 above the 80° F. temperature of the incoming air, and preferably this temperature is below the boiling point of the water in the pan. As indicated by the curved arrows, incoming air from the bottom of duct 14 passes over that spatial region within the chamber 10 immediately above and around the body of heated water 26 and thus becomes saturated. It will be observed that after passing around the ends of the pan 24 the temperature of the saturated air is still approximately 80° F.

Preferably the outer surface of pan 24 is provided with a heat insulating covering 25 which reduces heat transfer from the pan to the moisture saturated air stream flowing thereabout.

A plurality of pans 32 are positioned below the bottom of pan 24 and spaced therefrom, with each pan including a cooling coil 34 and a body of water 36. Any suitable coolant may be passed, by conventional means, not illustrated, through the cooling coils 34. With continued passage of the now saturated air over the water 36, as indicated by the curved arrows, the saturated air is cooled. The result of this cooling is the formation of very small droplets of water around the even smaller sized particles or nuclei, with the fog passing down into the bottom of the chamber 10. The bottom portion of the chamber 10 may be regarded as the test or environmental portion of the chamber 10 and this is the portion wherein a particular mold, drug, biological specimen, etc., is placed. A fan 38 is located at the bottom portion of the chamber 10 and is preferably of a relatively low volume or low displacement and maintains the continuous intake of atmospheric air into the chamber and the slow removal of the atmosphere at the bottom of the chamber, so that a continuous supply of fog is provided for the test region of the chamber.

A humidity sensing structure is illustrated as positioned at the lower portion of the chamber 10 and includes a generally U-shaped duct 40 having its two legs in fluid communication with the interior of the bottom portion of chamber 10. The top leg is provided with a heating coil 42 of conventional construction and the bight portion of the conduit 40 is provided with a humidity sensing device 44 of any desired conventional construction.

During the use of the fog generator of this invention as an environmental chamber for the testing of various organic systems and inorganic materials, it is desirable to test the relative humidity of the fog atmosphere present in the lower portion of the chamber. It is well known that the testing of relative humidity at fairly high relative humidities is rather difficult. One reason for this difficulty is the fact that small droplets of water may form on whatever humidity sensing element or apparatus is employed thus destroying the capability of the humidity sensing element to perform its intended function. It is well known that cooler air can carry less moisture without precipitation than relatively warmer air. Accordingly, air at a relatively higher temperature will exhibit a lower relative humidity than air at a relatively lower temperature for the same quantity of water. The presence of the heating coil 42 in one of the legs of conduit 40 heats the highly saturated air immediately adjacent it and this air is measured by the humidity sensing device 44. Because the relative humidity, for the reason given above, is less within the conduit 40 immediately adjacent the humidity sensing element 44, there is less danger of false or inaccurate readings. Stated somewhat differently, the arrangement comprising the conduit 40, the heating element 42, and the humidity sensing device 44 takes a very small portion of the atmosphere within the lower portion of the chamber 10, heats it, and then measures the relative humidity of the heated atmosphere. By a known correlation between he heating effect of the heating element 42, compensation for the difference in relative humidity between the sensed small portion of the fog atmosphere within chamber 10 and the major portion of the fog atmosphere is made, and an accurate determination of the true relative humidity within the bottom portion of the chamber 10 may be realized. If desired, one leg of the duct 40 may exhaust to a point outside the chamber 10.

It will be apparent that the walls 12 which define the environmental chamber 10 of this invention are provided with suitable openings for the insertion and withdrawal of whatever specimen is being tested within the chamber, though for purposes of clarity such openings have not been illustrated. It will further be apparent that practice of this invention enables those in this art to employ relatively conventional elements, together with associated (not illustrated) temperature measuring instruments. For example, a temperature measuring instrument is preferably located within the duct 14 and coupled to the heating and cooling elements 20 and 22, respectively, so as to maintain the incoming air at the desired value of approximately 80° F.

I claim:
1. An environmental chamber for the production of fog including:
   (1) a main chamber,
   (2) inlet means for leading atmospheric air into said chamber,
   (3) said inlet means including a filter and thermal conditioning means to maintain air fed into said chamber at a predetermined temperature,
   (4) means for providing a continuous flow of incoming atmospheric air,
   (5) means within said chamber for saturating said incoming atmospheric air with moisture,
   (6) means downstream of said saturation means for cooling said saturated air,
   (7) a U-shaped duct both ends of which are in communication with said main chamber for sampling the atmosphere of the chamber,
   (8) means for testing the relative humidity of said sample within said duct.
2. The environmental chamber of claim 1 wherein said duct includes means therein for raising the temperature of a portion of the atmosphere within said duct.
3. The environmental chamber of claim 1 wherein said saturating means is defined by a body of water.
4. The environmental chamber of claim 1 wherein said cooling means is defined by a body of water.

References Cited

UNITED STATES PATENTS

| | | | |
|---|---|---|---|
| 1,819,643 | 8/1931 | Fleisher | 62—176 X |
| 2,307,292 | 1/1943 | Palmer | 62—176 X |
| 3,073,127 | 1/1963 | Schmerzler | 62—3 |
| 3,171,473 | 3/1965 | Lawler | 236—44 X |
| 3,245,461 | 4/1966 | Allington | 236—44 X |
| 3,263,737 | 8/1966 | Brummendorf | 236—44 X |
| 3,346,040 | 10/1967 | Cohen | 236—44 X |

NORMAN YUDKOFF, *Primary Examiner.*

J. SOFER, *Assistant Examiner.*

U.S. Cl. X.R.

62—176; 73—29; 236—44